(12) United States Patent
Yamashida et al.

(10) Patent No.: US 9,802,283 B2
(45) Date of Patent: Oct. 31, 2017

(54) CUTTING TOOL AND CUTTING METHOD

(71) Applicants:NAMIKI SEIMITSU HOUSEKI KABUSHIKI KAISHA, Tokyo (JP); ADAMANT KOGYO CO., LTD., Tokyo (JP)

(72) Inventors: Hironori Yamashida, Tokyo (JP); Terumichi Sugimura, Tokyo (JP); Akinori Sugimura, Tokyo (JP); Koji Horiguchi, Tokyo (JP); Nobuo Imaizumi, Tokyo (JP)

(73) Assignees: Namiki Seimitsu Houseki Kabushiki Kaisha, Tokyo (JP); Adamant Kogyo Co., Ltd., Tokyo (JP)

( * ) Notice: Subject to any disclaimer, the term of this patent is extended or adjusted under 35 U.S.C. 154(b) by 271 days.

(21) Appl. No.: 14/425,988

(22) PCT Filed: Sep. 4, 2013

(86) PCT No.: PCT/JP2013/073785
§ 371 (c)(1),
(2) Date: Mar. 4, 2015

(87) PCT Pub. No.: WO2014/050467
PCT Pub. Date: Apr. 3, 2014

(65) Prior Publication Data
US 2015/0217418 A1    Aug. 6, 2015

(30) Foreign Application Priority Data
Sep. 6, 2012   (JP) ................... 2012-195613

(51) Int. Cl.
*B23K 26/00*   (2014.01)
*B23P 25/00*   (2006.01)
*B23B 27/20*   (2006.01)

(52) U.S. Cl.
CPC ............ *B23P 25/006* (2013.01); *B23B 27/20* (2013.01); *Y10T 407/24* (2015.01)

(58) Field of Classification Search
CPC .... B23K 26/40; B23K 26/037; B23K 26/064; B23K 26/364; B23K 26/0003
(Continued)

(56) References Cited

U.S. PATENT DOCUMENTS

| 7,002,100 | B2 | 2/2006 | Wu et al. |
| 2004/0104207 | A1 | 6/2004 | Wu et al. |
| 2010/0065536 | A1* | 3/2010 | Patten ................ B23K 26/0093 219/121.66 |

FOREIGN PATENT DOCUMENTS

| JP | 2009-509770 A | 3/2009 |
| JP | 2012-106325 A | 6/2012 |

OTHER PUBLICATIONS

International Search Report; PCT/JP2013/073785; dated Oct. 22, 2013.
(Continued)

*Primary Examiner* — Brian Jennison
(74) *Attorney, Agent, or Firm* — Studebaker & Brackett PC

(57) ABSTRACT

A cutting tool for cutting a hard brittle material is formed from a light-transmittable material through which laser light can pass and is provided with a rake angle, the laser light is propagated through the cutting tool, the cutting tool and the hard brittle material are brought into contact with each other, the laser light is incident to at least a contact part where the cutting tool and the hard brittle material are in contact with each other and a part with the rake angle, the laser light except for Fresnel reflection light on an end surface of the cutting tool is incident to the hard brittle material through the (Continued)

contact part and the rake angle part to soften the hard brittle material, and the softened hard brittle material is cut.

5 Claims, 11 Drawing Sheets

(58) Field of Classification Search
USPC .................................................. 219/121.69
See application file for complete search history.

(56) References Cited

OTHER PUBLICATIONS

Shin, Yung C.; "Laser assisted machining"; Industrial Laser Solutions; vol. 26 Issue 1; Jan. 1, 2011.

* cited by examiner

CUTTING TOOL AND CUTTING METHOD

TECHNICAL FIELD

The present invention relates to a cutting tool and a cutting method, specifically to a cutting tool and a cutting method for use in cutting hard brittle materials.

BACKGROUND ART

Single crystals such as silicon carbide, sapphire, silicon (Si), and germanium (Ge), and ceramics such as alumina, zirconia, ferrite, and silicon nitride are hard brittle materials that cannot be cut but are processed by grinding or polishing work.

There have been devised methods for grinding or polishing hard brittle materials with use of particles of diamond or cubic boron nitride (CBN). In addition, methods for cutting such materials through heating with laser light or the like have been also attempted. However, these cutting methods using laser light are addressed for glass materials, hard-to-cut metal materials, and the like, but are not suited for hard brittle materials. Nevertheless, with the advancement of laser techniques in recent years, there have been increasingly proposed cutting methods for cutting hard brittle materials while softening the materials by heating with laser light.

For example, Non-patent Document 1 described later discloses that ceramic 101 (silicon chloride and partially-stabilized zirconia) is cut by 1500 watts of carbon dioxide laser light 100 as illustrated in FIG. 7. Non-patent Document 1 also reports a method for cutting a material by cubic boron nitride (CBN) as a cutting tool 102 under processing conditions with a cutting speed of 1 to 2 mm/sec and a cutting depth of 0.5 to 1 mm.

Patent Document 1 described later discloses a cutting method by which the focus of laser light 104a, 104b is adjusted to the surface of a material to be cut 105 placed at a distance of approximately 1 to 10 μm from the blade edge of a cutting tool 103 in the direction of forward movement as illustrated in FIG. 8, the laser light 104a, 104b is incident to the material to be cut from the top, and an irradiated part 105a irradiated with the laser light 104a, 104b is softened as illustrated in FIG. 9 and then cut.

Patent Document 2 described later discloses a cutting method by which a cutting tool 106 (for example, diamond) that can transmit laser light with an emission wavelength used (for example, YAG laser light of 1060 nm) is used as a waveguide for laser light to propagate the laser light and apply the laser light from the blade edge of the cutting tool 106 directly to the surface of a material to be cut 107.

CITATION LIST

Patent Literatures

Non-patent Document 1: Yung C. Shin, INDUSTRIAL Laser Solutions, Laser assisted machining, (2011)
Patent Document 1: U.S. Pat. No. 7,002,100
Patent Document 2: US2010/0065536

SUMMARY OF THE INVENTION

Problems to be Solved by the Invention

However, according to the cutting method described in Non-patent Document 1, the material to be cut and the blade edge of the cutting tool are arranged at an angle of 90°, and thus the laser light irradiation part and the part to be cut of the material are physically separated from each other. Therefore, the laser light irradiation part cannot be cut quickly due to the separation. The laser light irradiation part needs to be irradiated with high-energy laser light allowing cutting work of the part to be cut.

Since the part to be cut needs to be heated excessively with laser light due to the separation of the part to be cut from the laser light irradiation part, the heating causes transformation of physical properties of the material to be cut (for example, grain growth), and thermal expansion of the material to be cut and a cutting machine such as a collet chuck supporting the material. Thus, it is difficult to perform cutting work with high dimensional accuracy according to the cutting method described in Non-patent Document 1.

In addition, according to the cutting method described in Patent Document 1, the laser light is incident to the surface of the material to be cut with the focus of the laser light separated at a distance of approximately 1 to 10 μm from the blade edge of the cutting tool. It is thus not possible to project the laser light with a focus adjusted directly to the part of the material to be cut in contact with the blade edge of the cutting tool. Therefore, when the cutting work is actually performed in the direction of arrow D as illustrated in FIG. 11, cutting dust 108 produced from the material to be cut 105 by the cutting tool 103 is raised on the blade edge, and the laser light 104a is blocked by the raised cutting dust 108. Accordingly, along with the progress of the cutting work, the surface of the material to be cut 105 becomes increasingly difficult to be heated.

Thus, according to the cutting method described in Patent Document 1, it is also necessary to apply excessive laser light energy to heat the material to be cut 105 together with the cutting dust 108. The heating causes transformation of physical properties of the material to be cut (for example, grain growth) and thermal expansion of the material to be cut and the cutting machine supporting the material, as in the case of the cutting method described in Non-patent Document 1. Therefore, it is difficult to perform cutting work with high dimensional accuracy according to the cutting method described in Patent Document 1.

According to the cutting method described in Patent Document 2, the cutting tool is used as a waveguide for laser light, and thus there is no concern that cutting dust blocks the laser light, which provides an advantage that the surface of the material to be cut can be directly heated. Besides, the tip of the cutting tool is very small and thus allows a load of GPa (gigapascal) or more to be applied intensively on the surface of the material to be cut in contact with the tip of the cutting tool. Therefore, it is possible to deform elastically the structure of the material to be cut, induce locally metal phase transition, and perform ductile mode cutting.

However, when diamond is used for the cutting tool, for example, the refractive index of diamond is 2.4 or more, and therefore laser light is totally reflected within the cutting tool unless the tip of the cutting tool is optically designed and shaped in such a manner as to prevent total reflection. This lowers the efficiency of emitting the laser light to the outside of the cutting tool to approximately 10 to 15%, which allows only a small amount of laser light energy to be applied to the material to be cut.

Thus, it is necessary to design optically the angle of the tip of the cutting tool, the laser emission surface, and the like in such a manner as to prevent total reflection of laser light. However, Patent Document 2 merely discloses that the side walls of the cutting tool are gold-plated for prevention of total reflection, and laser light that is multiply-reflected in the cutting tool and is accidentally emitted from the tip of the cutting tool is used. This method does not ensure improvement in efficiency of emitting the laser light and is not suited for industrial application.

In light of the foregoing circumstances, an object of the present invention is to provide a cutting method and a cutting tool for hard brittle materials that avoid total reflection of laser light, improve the efficiency of emitting the laser light, and eliminate the need for excessive laser light heating.

Solutions to the Problems

The foregoing object is attained by the present invention as follows.

A cutting tool of the present invention is characterized in that the cutting tool that is in contact with a hard brittle material and cut the hard brittle material at a contact part is formed from a light-transmittable material through which laser light can pass, and is provided with a rake angle, the laser light is propagated through the cutting tool, the laser light is incident to at least the contact part where the cutting tool and the hard brittle material are in contact with each other and a part with the rake angle, the laser light except for Fresnel reflection light on an end surface of the cutting tool is incident to the hard brittle material through the contact part and the part with the rake angle part to soften the hard brittle material, and the softened hard brittle material is cut.

In one embodiment of the cutting tool of the present invention, it is preferable that the hard brittle material is formed from a material causing metal phase transition by coming into contact with the cutting tool, and a contact load between the cutting tool and the hard brittle material is set to a load causing the metal phase transition in the hard brittle material.

In another embodiment of the cutting tool of the present invention, it is preferable that the cutting tool is formed from diamond or cubic boron nitride.

In another embodiment of the cutting tool of the present invention, it is preferable that the laser light except for the Fresnel reflection light on the end surface of the cutting tool is incident through the contact part and the part with the rake angle to the hard brittle material perpendicularly to a planar direction of a surface of the hard brittle material that is in contact with the cutting tool.

In another embodiment of the cutting tool of the present invention, it is preferable that the laser light propagating through the cutting tool is parallel light.

In another embodiment of the cutting tool of the present invention, it is preferable that the end surface is formed in an arc shape as the cutting tool is seen along the cutting direction of the hard brittle material, and when the radius of the end surface is designated as R, a diameter of light flux of the laser light emitted from the end surface of the cutting tool as seen along the cutting direction is designated as 2r, the refractive index of the cutting tool corresponding to a wavelength of the laser light is designated as n1, the refractive index of atmosphere outside the cutting tool is designated as n2, and the critical angle at which the laser light is totally reflected at an angle normal to the end surface of the cutting tool at the time of emission of the laser light from the inside to the outside of the cutting tool is designated as θcrt°, the radius R of the end surface is expressed as follows:

$$R > [r/\sin(\theta crt)]. \quad \text{[Equation 1]}$$

In another embodiment of the cutting tool of the present invention, it is preferable that the end surface is formed in a V shape as the cutting tool is seen along the cutting direction of the hard brittle material, and when the refractive index of the cutting tool corresponding to a wavelength of the laser light is designated as n1 and the refractive index of the atmosphere outside the cutting tool is designated as n2, a total-reflection condition is expressed as follows:

$$\theta max = \sin^{-1}(n2/n1) \quad \text{[Equation 2]}$$

and a V-shaped opening angle φ is set under the total-reflection condition as follows:

$$\phi > 2 \times (90° - \theta max). \quad \text{[Equation 3]}$$

A cutting method of the present invention includes: forming a cutting tool for cutting a hard brittle material from a light-transmittable material through which laser light can pass and providing the cutting tool with a rake angle; propagating the laser light through the cutting tool, and bringing the cutting tool and the hard brittle material into contact with each other to irradiate with the laser light at least a contact part where the cutting tool and the hard brittle material are in contact with each other and a part with the rake angle; irradiating the hard brittle material through the contact part and the part with the rake angle with the laser light except for Fresnel reflection light on an end surface of the cutting tool to soften the hard brittle material; and cutting the softened hard brittle material.

In one embodiment of the cutting method of the present invention, it is preferable that the hard brittle material is formed from a material causing metal phase transition by coming into contact with the cutting tool, and a contact load between the cutting tool and the hard brittle material is set to a load causing the metal phase transition in the hard brittle material.

In another embodiment of the cutting method of the present invention, it is preferable that the cutting tool is formed from diamond or cubic boron nitride.

In another embodiment of the cutting method of the present invention, it is preferable that the laser light except for the Fresnel reflection light on the end surface of the cutting tool is incident through the contact part and the part with the rake angle to the hard brittle material perpendicularly to a planar direction of a surface of the hard brittle material that is in contact with the cutting tool.

In another embodiment of the cutting method of the present invention, it is preferable that the laser light propagating through the cutting tool is parallel light.

In another embodiment of the cutting method of the present invention, it is preferable that the end surface is formed in an arc shape as the cutting tool is seen along a cutting direction of the hard brittle material, and when a radius of the end surface is designated as R, a diameter of light flux of the laser light emitted from the end surface of the cutting tool as seen along the cutting direction is designated as 2r, a refractive index of the cutting tool corresponding to a wavelength of the laser light is designated as n1, a refractive index of atmosphere outside the cutting tool is designated as n2, and a critical angle at which the laser light is totally reflected at an angle normal to the end surface of the cutting tool at the time of emission of the laser light from the inside to the outside of the cutting tool is designated as θcrt°, the radius R of the end surface is expressed as follows:

$$R > [r/\sin(\theta crt)]. \quad \text{[Equation 4]}$$

In another embodiment of the cutting method of the present invention, it is preferable that the end surface is formed in a V shape as the cutting tool is seen along a cutting direction of the hard brittle material, and when a refractive index of the cutting tool corresponding to a wavelength of the laser light is designated as n1 and a refractive index of atmosphere outside the cutting tool is designated as n2, a total-reflection condition is expressed as follows:

$$\theta max = \sin^{-1}(n2/n1) \quad [\text{Equation 5}]$$

and a V-shaped opening angle φ is set under the total-reflection condition as follows:

$$\phi > 2 \times (90° - \theta max). \quad [\text{Equation 6}]$$

Effects of the Invention

According to the present invention, it is possible to cut a hard brittle material without generation of cracks, avoid total reflection of laser light, and improve the efficiency of emitting the laser light.

Further, it is possible to prevent the occurrence of a factor for inhibiting cutting work, which caused by cutting dust produced from the material to be cut during the cutting work. Thus, the material to be cut can be heated directly by irradiation of the laser light, and the need for excessive laser light heating can be eliminated. Therefore, it is possible to cut the hard brittle material with high dimensional accuracy.

Furthermore, according to the present invention, by propagating the laser light through the cutting tool, it is possible to uniform the direction of irradiation of the laser light and the direction of approach of the cutting tool toward the material to be cut. Therefore, it is possible to cut the material to be cut even if the material is a non-light-transmittable material. This allows fabrication of a three-dimensional structure having an internal shape such as a cylinder by cutting work.

DESCRIPTION OF EMBODIMENTS

Figure 1:
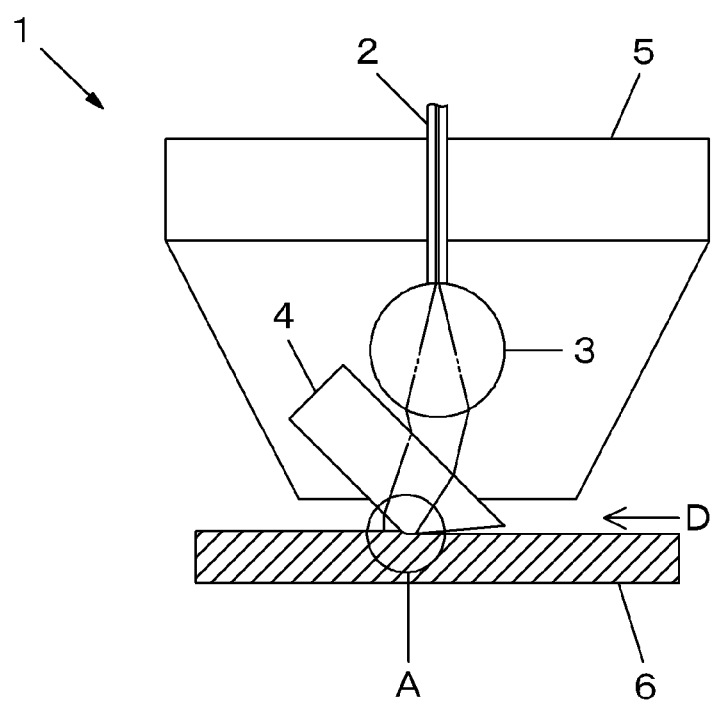
FIG. 1 is a schematic diagram for describing a cutting tool and a cutting method according to an example of an embodiment of the present invention.

A cutting tool and a cutting method according to the present invention will be described below in detail. FIG. 1 is a schematic diagram for describing the cutting tool and the cutting method according to an example of an embodiment of the present invention. As illustrated in FIG. 1, a cutting apparatus 1 according to the embodiment includes an optical fiber 2, a convergence lens 3, a cutting tool 4, and a casing 5 supporting these components. A part of an end surface of the cutting tool 4 is brought into contact with a material to be cut 6, and the material to be cut 6 is cut at the contact part.

In addition, in the present invention, the cutting tool 4 is formed from a light-transmittable material through which laser light can pass. The laser light is propagated through the optical fiber 2. The laser light is converged on the convergence lens 3 and then propagated through the cutting tool 4. The laser light is then incident to the material to be cut 6 via the cutting tool 4. By irradiation of the laser light, the material to be cut 6 is softened and the softened part is cut along a cutting direction indicated by an arrow D, whereby the material to be cut 6 is cut.

The laser light is emitted from a laser light source not illustrated, and propagated through the optical fiber 2. Subsequently, the laser light is converged on the convergence lens 3, and entered into the cutting tool 4. The laser light used has a wavelength of 800 nm to 1600 nm and an output of 200 mW or more and 100 W or less. Specifically, YAG laser light is preferable. Alternatively, carbon dioxide laser or visible-light laser may be used depending on a material to be processed, for example. However, the laser light needs to have a wavelength with which the cutting tool 4 is transmittable to the laser light.

The optical fiber 2 through which the laser light is propagated is a single-mode optical fiber that includes a core and a cladding that has a lower refractive index than that of the core and surrounds the core. The optical fiber 2 may be a silica-based optical fiber, for example. As a general-purpose optical fiber, the optical fiber 2 may have a core diameter of 8 μm or more and 100 μm or less. For a high-power laser light guide, the optical fiber 2 may have a core radius of more than 1000 μm to allow propagation of kilowatt-class laser light.

The convergence lens 3 and the cutting tool 4 are arranged in order at an end part of the optical fiber 2. The convergence lens 3 is interposed between the optical fiber 2 and the cutting tool 4 to converge and collect the incident laser light. The convergence lens 3 may be an aspherical lens, a ball lens, a gradient index lens, or the like. The material for the convergence lens 3 may be silica glass or the like, for example.

The optical fiber 2 and the convergence lens 3 may be prepared as separate optical components. However, as illustrated in FIG. 1, it is preferable to use the optical fiber 2 equipped with the convergence lens 3 that is formed by aligning in advance the optical fiber 2 and the convergence lens 3 and integrally joining the end part of the optical fiber 2 and the optical surface of the convergence lens 3 because this eliminates the need for alignment during cutting work.

The cutting tool 4 is formed from a light-transmittable material, specifically, diamond or cubic boron nitride. Diamond or cubic boron nitride has a high light transmissibility to the propagated laser light with a wavelength of 800 nm to 1600 nm, which is a preferable material for the cutting tool 4 from the viewpoint of suppression of attenuation of the laser light. In particular, single crystal diamond or sintered polycrystal diamond is more preferable as a light-transmittable material.

Referring to FIG. 1, the focal length of the convergence lens 3 is decided according to technical requirements that the laser light needs to reach the surface of the material to be cut 6 via the cutting tool 4 and a part of the material to be cut 6 that is softened by heating with the laser light needs to be subjected to ductile mode cutting. In addition, the focal length is also decided from the required values of the cutting efficiency and cutting speed. If the focus of the laser light is excessively narrowed down, the energy density of the laser light becomes too high and the cutting tool 4 generates heat before heating of the material to be cut 6. In this case, when the cutting tool 4 is formed from diamond, the diamond causes significant wearing of the cutting tool 4.

In consideration of the foregoing matters, it is preferable to make an optical design of the focal diameter on the surface of the material to be cut 6 to be 10 μm or more and 200 μm or less. As a matter of course, the optimum value of the focal diameter depends on the energy density of the laser light per unit area. In the present invention, the focal diameter is set within the range not causing self-destruction of the cutting tool 4 due to wear.

The curvature radius of the convergence lens 3 and the distance from the optical surface of the convergence lens 3 to the surface of the material to be cut 6 are set such that, after propagation through the cutting tool 4, the laser light focuses on the surface of the material to be cut 6 that is in contact with the blade edge of the end surface of the cutting tool 4.

The laser light propagating through the cutting tool 4 may be convergent light but is preferably parallel light. By propagating the parallel laser light through the cutting tool 4, it is possible to prevent the energy density of the laser light from being excessively high at the blade edge of the end surface of the cutting tool 4, and avoid damage to the cutting tool 4.

The laser light dispersing on the surface of the material to be cut 6 is excluded from the laser light for use in the cutting work because it is difficult to heat sufficiently the material to be cut 6 with such laser light and form a softened part in the material to be cut 6 and it is also difficult to apply such laser light uniformly to the laser irradiation part of the surface of the material to be cut 6.

The material to be cut 6 is a hard brittle material. The material to be cut 6 may be any hard brittle material, but more preferably, is a hard brittle material causing metal phase transition by coming into contact with the cutting tool 4. This is because a part of the material to be cut 6 with metal phase transition is optically transparent but exhibits metallic behavior to absorb the laser light selectively and produce the effects of heating and temperature increase, which allows ductile mode cutting work. Accordingly, the material to be cut 6 can be cut without destruction marks.

The contact load of the cutting tool 4 and the hard brittle material is set to a load that causes metal phase transition in the hard brittle material. Under the load applied on the blade edge of the end part of the cutting tool 4, when the hard brittle material is locally pressed and deformed at 20 GPa or more, the hard brittle material undergoes a structural change and induces metal phase transition, thereby allowing ductile mode cutting as with metallic materials. By heating the hard brittle material directly with the laser light concurrently with the metal phase transition under the contact load, the part of the material to be cut 6 allowing ductile mode cutting is increased. The coverage of the contact load is several μm in width and approximately 100 nm in depth.

Specific examples of a hard brittle material causing metal phase transition are single crystals such as silicon carbide, sapphire, silicon (Si), and germanium (Ge), and ceramics such as alumina, zirconia, ferrite, and silicon nitride. By using such hard brittle materials as the material to be cut 6, the ductile mode cutting by softening can be stably performed. Of the foregoing hard brittle materials, the rupture strength (transverse rupture strength) and hardness of silicon carbide, alumina, and zirconia are as follows: silicon carbide (rupture strength: 0.3 GPa or more and 0.8 GPa or less, hardness: 25 GPa or less), alumina (rupture strength: 0.3 GPa or more and 0.5 GPa or less, hardness: 18 GPa or less), zirconia (rupture strength: 1.0 GPa or more and 1.2 GPa or less, hardness: 13 GPa or less). Meanwhile, single crystal diamond as an example of the material for the cutting tool 4 has the rupture strength of 2 GPa or less and the hardness of 120 GPa or less.

Figure 4:
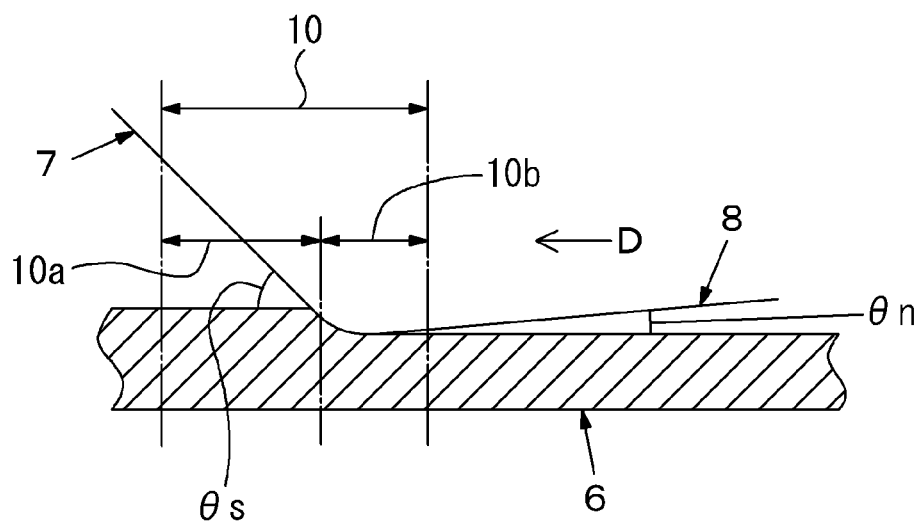
FIG. 4 is an enlarged view of a circular section A in FIG. 1.

Next, a configuration of the end part of the cutting tool 4 will be further described with reference to FIG. 4. FIG. 4 is an enlarged view of a circular section A in FIG. 1. Referring to FIG. 4, when any of single crystals such as silicon carbide, sapphire, silicon (Si), and germanium (Ge), and ceramics such as alumina, zirconia, ferrite, and silicon nitride is cut in a ductile mode, the cutting tool 4 preferably has a rake angle θs of approximately 3.2° or more and 60° or less, and has a clearance angle θn of 0° or more and 5° or less. In the angle ranges, a rake angle θs of 45° and a clearance angle θn of 0° or more provide the highest processing efficiency. Incidentally, the rake angle θs refers to an angle formed by a rake surface 7 formed in the cutting tool 4 to be oblique to the planar direction of the material to be cut 6 and the planar direction, as illustrated in FIG. 4. Meanwhile, the clearance angle θn refers to an angle formed by a clearance surface 8 formed in the cutting tool 4 to be oblique to the planar direction of the material to be cut 6 and the planar direction, as illustrated in FIG. 4. For convenience of description, the rake angle θs and the clearance angle θn will be represented by absolute values without the plus and minus symbols indicative of the directions in which the angles are formed.

Referring to FIG. 1, a commercially-available diamond square prism, 1 mm wide, 1 mm deep, and 5 mm long, is inclined at 45° relative to the planar direction of the material to be cut 6 to form the rake angle θs, and one end side of the square prism is set as a cutting tool blade edge. In addition, the clearance surface 8 is formed at the clearance angle θn of 5°. The cutting apparatus illustrated in FIG. 1 has a structural advantage that, when diamond is used for the cutting tool 4, for example, the cutting tool 4 can be formed only by providing the commercially-available diamond square prism with the blade edge and the clearance surface 8 at one end, which reduces the load of processing the cutting tool 4 in a special geometry. As a matter of course, the cutting tool 4 is not limited to a square prism but may be structured in any special shape based on the technical idea of the present invention.

Figure 2:
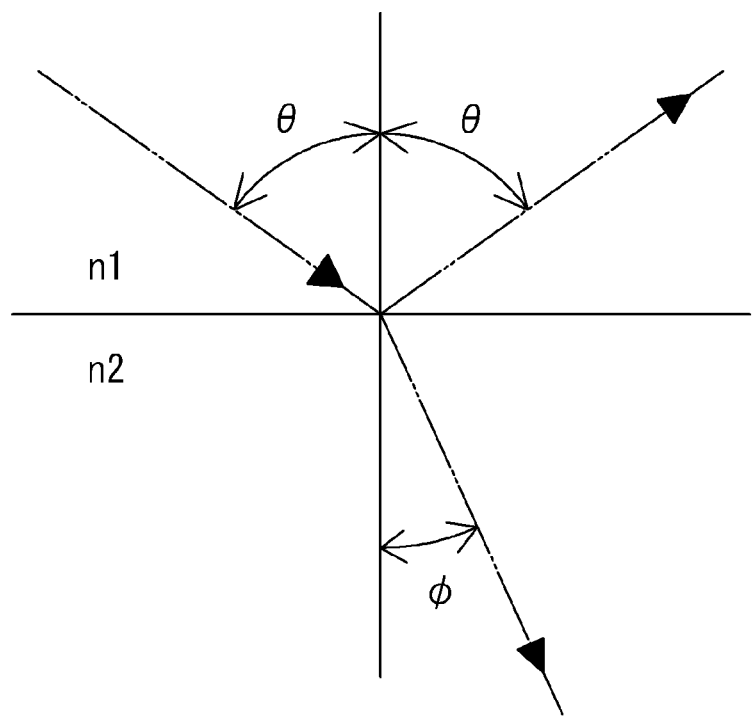
FIG. 2 is a conceptual diagram for describing laws of reflection and refraction.

Next, the conditions under which the laser light propagating through the cutting tool 4 is not totally reflected on the end surface of the cutting tool 4 will be described with reference to FIG. 2. FIG. 2 is a conceptual diagram for describing laws of reflection and refraction. Incidentally, the end surface of the cutting tool 4 refers to the end surface facing the material to be cut 6. Referring to FIG. 2, as a condition under which the laser light is not totally reflected, a critical angle θmax is decided as expressed in Equation 9. The θmax is derived from Equations 7 and 8 obtained from Snell's law. In Equation 9, as the maximum value of θ, sin φ is set to 1.

$$(n1)\sin\theta = (n2)\sin\phi \quad \text{[Equation 7]}$$

$$\sin\phi = (n1/n2)\sin\theta \quad \text{[Equation 8]}$$

$$\theta\text{max} = \sin^{-1}(n2/n1) \quad \text{[Equation 9]}$$

With regard to the relationship between reflection and refraction of the laser light on an interface between a medium with a refractive index n1 and a medium with a refractive index n2, in consideration of both S-wave and P-wave as polarization components of the laser light, when corresponding reflections are designated as Rs and Rp and the average of the two is designated as R, respective reflection ratios are expressed by Equations 10, 11, and 12 as follows:

$$Rs=\sin^2(\theta-\phi)/\sin^2(\theta+\phi) \quad \text{[Equation 10]}$$

$$Rp=\tan^2(\theta-\phi)/\tan^2(\theta+\phi) \quad \text{[Equation 11]}$$

$$R=(Rs+Rp)/2 \quad \text{[Equation 12]}$$

Figure 3:
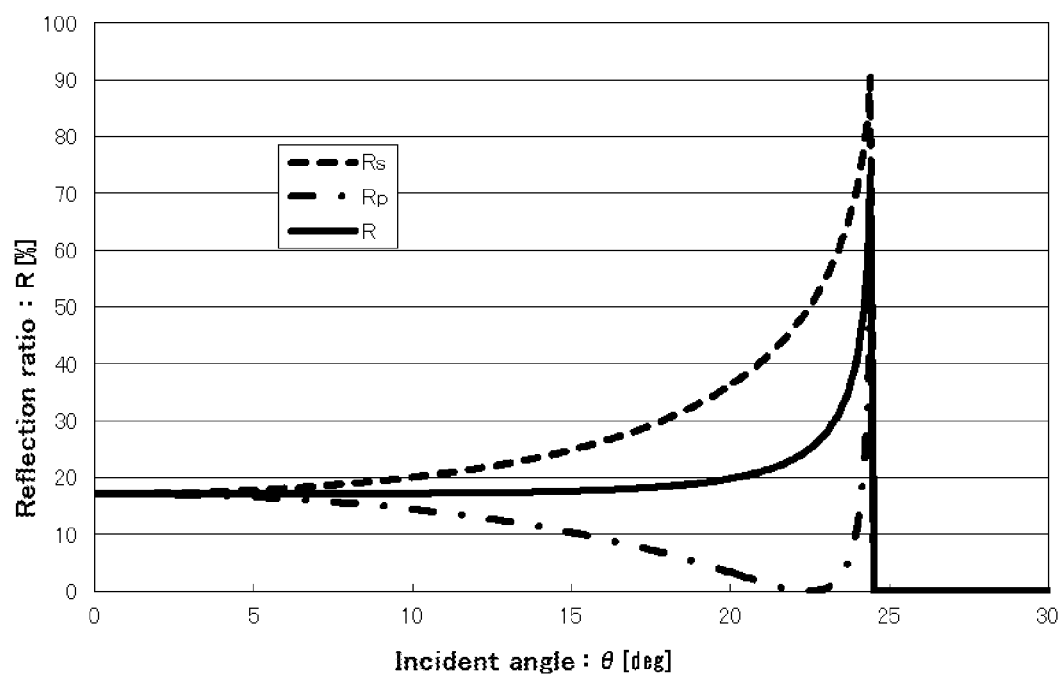
FIG. 3 is a graph indicating a critical angle Amax at which a diamond cutting tool causes total reflection.

Referring to FIG. 3, when laser light with a wavelength of 1550 nm is propagated through the diamond cutting tool 4 to heat the material to be cut 6 as an example, the critical angle θmax formed by total reflection is derived to be 24.4°. At this time, the refractive index n1 of the diamond is 2.417, the refractive index n2 of the atmosphere outside the cutting tool 4 is 1. The position and geometry of the cutting tool 4 needs to be designed based on the thus derived critical angle θmax.

Next, it will be discussed where to preferably set the emitting position of the laser light at the end part of the cutting tool 4. Assuming that the material for the cutting tool 4 is diamond and the rake angle θs is set to 45°, the diamond square prism is inclined at 45° relative to the planar direction of the material to be cut 6. When laser light with a wavelength of 1550 nm is used on the incident surface, θ=θs is expressed by Equation 8. When θs=45°, n1=1, and n2=2.417, the following equation holds:

$$\phi=\sin^{-1}[(n1/n2)\sin(45)] \quad \text{[Equation 13]}$$

Therefore, $\phi=17.01°$ which is smaller than 24.4°. Accordingly, no total reflection takes place at the end part of the cutting tool 4 and the laser light except for the Fresnel reflection light is propagated through the cutting tool 4.

On the other hand, when the critical angle is used, the incident angle θ is limited to almost 86.8° at a maximum (when $\phi=24.4°$). In the case of the diamond cutting tool 4, the largest angle not causing total reflection on the end surface, that is, the smallest rake angle θs is 86.8−90=−3.2° (an absolute value of 3.2°). As an optical limitation, the rake angle θs is limited to 3.2°. Further, when the angle θs is approximately 60° or less, ductile mode cutting is enabled. Therefore, when the rake angle θs is 3.2° or more and 60° or less, it is possible to avoid total reflection on the end surface of the cutting tool 4 and improve the efficiency of emitting the laser light.

In practice, taking into account the efficiency of cutting the hard brittle material, the rake angle θs is set preferably to 30° or more and 60° or less, most preferably to 45° or more and 60° or less to eliminate total reflection on the end surface of the cutting tool 4 and deliver the highest cutting efficiency.

On the rake surface 7 side, the laser light having been propagated through the cutting tool 4 can also pass through the emission side interface of the tool arranged at 45°, thereby to contribute to irradiation and heating of the piece to processed. The problem is the behavior of the laser light incident toward the clearance angle θn side.

With regard to the angle of the laser light relative to the emission surface through which the laser light is emitted from the diamond to the atmosphere, at the incident angle of 45°, the laser light is totally reflected and is not incident to the outside even at the clearance angle θn=0° from the relationship in Equations 7, 8, and 9 described above. That is, when the substance in contact with the end surface of the cutting tool 4 is the air, the laser light incident to the clearance surface 8 cannot pass through the end surface to the outside, which does not contribute to heating of the material to be cut 6.

However, when the refractive index of the hard brittle material is higher than the refractive index of the cutting tool 4 (for example, when the cutting tool 4 is formed from diamond and the hard brittle material is silicon carbide: 2.6 or silicon: 3.4), a high-pressure contact load is applied from the blade edge of the cutting tool 4 to the hard brittle material during the cutting work. This causes metal phase transition in the material to be cut 6 in the vicinity of the contact part of the blade edge. At that time, when the effective refractive index (the refractive index of the hard brittle material with the metal phase transition) is higher than the refractive index of the cutting tool 4, the total reflection on the end surface of the cutting tool 4 is avoided. Thus, the laser light emitted from the end surface of the cutting tool 4 is absorbed in the surface of the material to be cut 6. When the refractive index of the hard brittle material is higher than the refractive index of the cutting tool 4, the relationship (the refractive index of the hard brittle material)>(the refractive index of the cutting tool 4) is satisfied. When the effective refractive index of the hard brittle material is higher than the refractive index of the cutting tool 4, the relationship (the effective refractive index of the hard brittle material)>(the refractive index of the cutting tool 4) is satisfied.

As illustrated in FIG. 4, a range 10 where the material to be cut 6 can be heated and increased in temperature by the laser light covers an irradiation range 10a on the rake surface 7 side of the material to be cut 6 around the curved surface of the blade edge of the end part (the rake angle θs part), a part of the material to be cut 6 that is in direct contact with the cutting tool 4 (hereinafter, referred to as a contact part as necessary), and a part 10b of the material to be cut 6 with metal phase transition caused by the contact with the cutting tool 4. The 10b includes the part of the material to be cut 6 that is in direct contact with the cutting tool 4. In the present invention, the laser light except for the Fresnel reflection light on the end surface of the cutting tool is incident to the hard brittle material through the contact part and the rake angle θs part, and thus the laser light is not totally reflected.

The laser light except for the Fresnel reflection light on the end surface of the cutting tool 4 is preferably incident to the hard brittle material perpendicularly to the planar direction of the surface of the hard brittle material that is in contact with the cutting tool 4, at least through the contact part and the rake angle part 10a. When the laser light enters at an appropriate angle relative to the cutting tool 4, the restriction due to total reflection is relaxed. However, the laser light is more preferably perpendicular to the material to be cut 6 from the viewpoints of facilitating alignment of the components 2, 3, 4, and 6, preventing out-of-focus of the laser light to be incident to the material to be cut 6, and preventing dispersion of energy density of the laser light. The planar direction of the surface of the hard brittle material is parallel to the direction of arrow D in FIG. 1.

Figure 5:
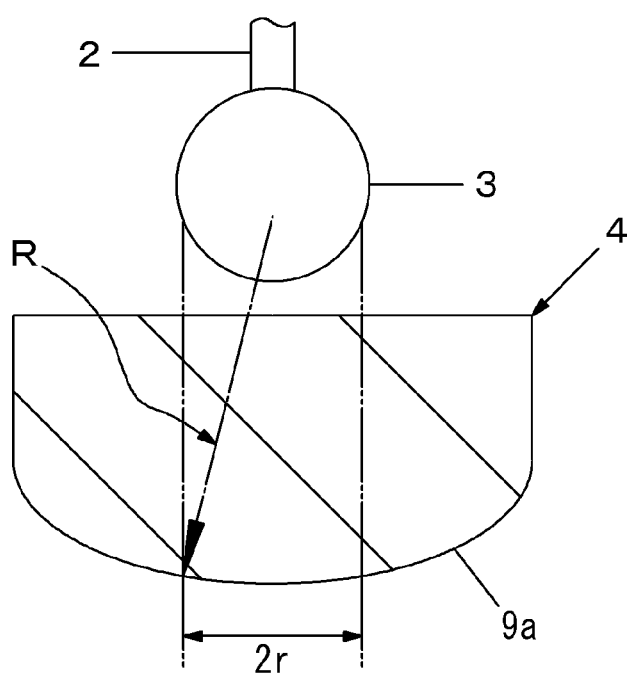
FIG. 5 is an illustrative diagram of a cutting tool with an arc-shaped end surface, an optical fiber, and a convergence lens.

The blade edge of the end surface of the cutting tool 4 illustrated in FIGS. 1 and 4 preferably has a technical structure to control the weight of the cutting tool 4 to apply a load causing metal phase transition on the hard brittle material. As an example, when the cutting tool 4 is seen along the cutting direction of the hard brittle material (the direction of arrow D in FIG. 1 or 4), the cross-sectional shape of the end surface of the cutting tool 4 is an arc shape as illustrated in FIG. 5. Incidentally, the cross-sectional shape of the end surface of the cutting tool 4 refers to the shape of the cross-section perpendicular to the direction of arrow D.

Assuming that the radius of the end surface of the cutting tool 4 is designated as R, the laser light propagating through the cutting tool 4 is parallel light, the diameter of light flux of the laser light emitted from the end surface of the cutting tool 4 as seen along the cutting direction is designated as 2r, the refractive index of the cutting tool 4 corresponding to the wavelength of the laser light is designated as n1, the refractive index of the atmosphere outside the cutting tool 4 is designated as n2, and the critical angle causing total reflection of the laser light at an angle normal to the end surface of the cutting tool 4 during irradiation of the laser light from the inside to the outside of the cutting tool 4 is designated as $\theta\mathrm{crt}°$, the radius of the end surface R is limited as expressed by Equation 14 as follows:

$$R=[r/\sin(\theta\mathrm{crt})] \quad \text{[Equation 14]}$$

The end surface of the cutting tool 4 is in constant contact with the material to be cut 6 by approximately 1 μm in the cutting direction. The end surface of the cutting tool 4 has a width of approximately 50 μm in an arc shape (round-nose type) as illustrated in FIG. 5, for example. In this case, when a load of 100 g is applied to the cutting tool 4, the material to be cut 6 is subjected to a load of approximately 20 GPa as expressed by Equation 15 as shown below, which is sufficient for the hard brittle material to cause metal phase transition.

$$F=(0.1\ \mathrm{kg}\times 9.8)/(5\times 10^{-11}\ \mathrm{m}^2) \quad \text{[Equation 15]}$$

Therefore, when the cutting tool 4 with the end surface shaped as illustrated in FIG. 5 is used, the smallest curvature radius expressed by Equation 14 needs to be as defined by Equation 16 as follows:

$$R>[r/\sin(\theta\mathrm{crt})] \quad \text{[Equation 16]}$$

For example, when the cutting tool 4 is formed from diamond and the light flux diameter 2r is 100 μm, the radius R is set to be larger than 121 μm (R>121 μm) as expressed by Equation 17 as shown below to propagate the laser light to the surface of the material to be cut 6 without total reflection.

$$R=50/\sin(24.4°)=121\ \mu\mathrm{m} \quad \text{[Equation 17]}$$

Further, by forming the end surface of the cutting tool 4 in such a shape as illustrated in FIG. 5, it is possible to reduce the roughness of the surface to be cut and speed up the cutting work.

Figure 6:
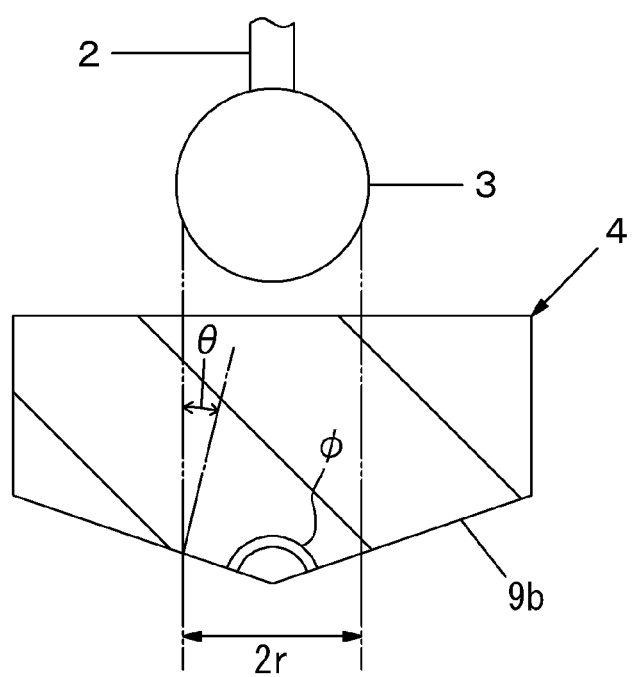
FIG. 6 is an illustrative diagram of a cutting tool with a V-shaped end surface, an optical fiber, and a convergence lens.
Figure 7:
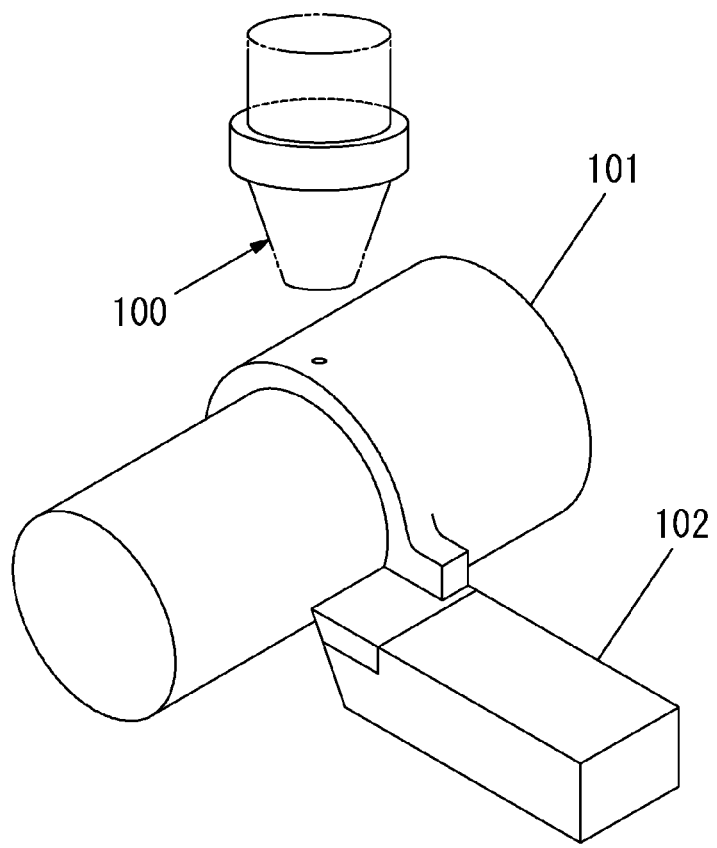
FIG. 7 is a perspective view for describing an example of conventional cutting work of ceramics.
Figure 8:
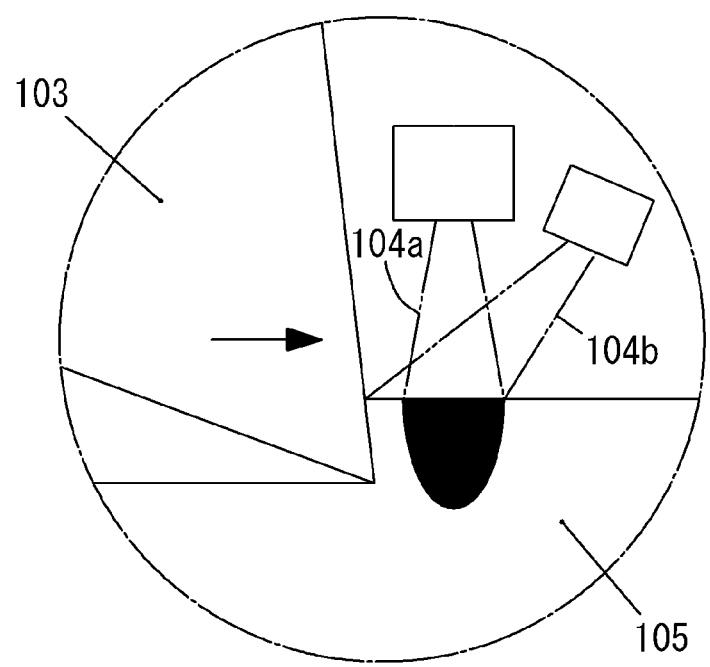
FIG. 8 is an illustrative diagram for describing an example of conventional cutting work using laser light.
Figure 9:
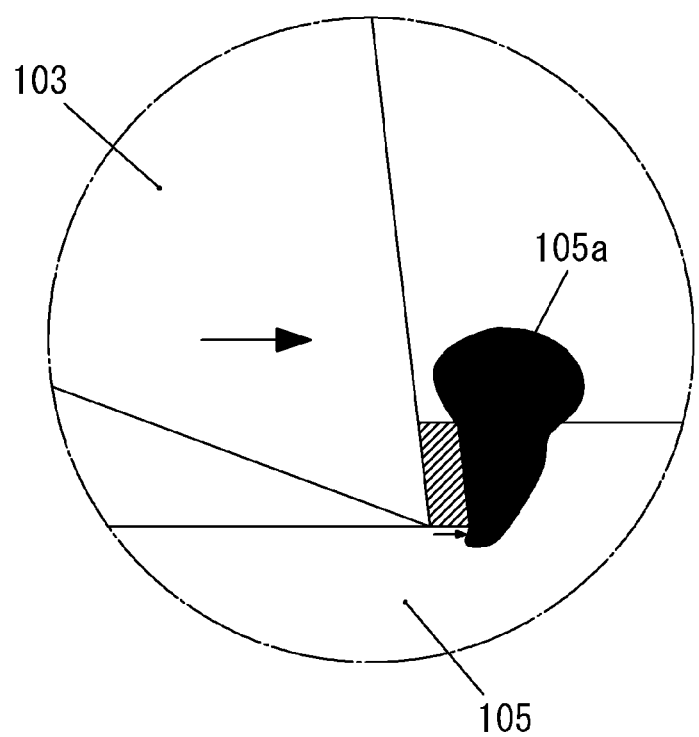
FIG. 9 is an illustrative diagram for further describing the example of the cutting work in FIG. 9.
Figure 10:
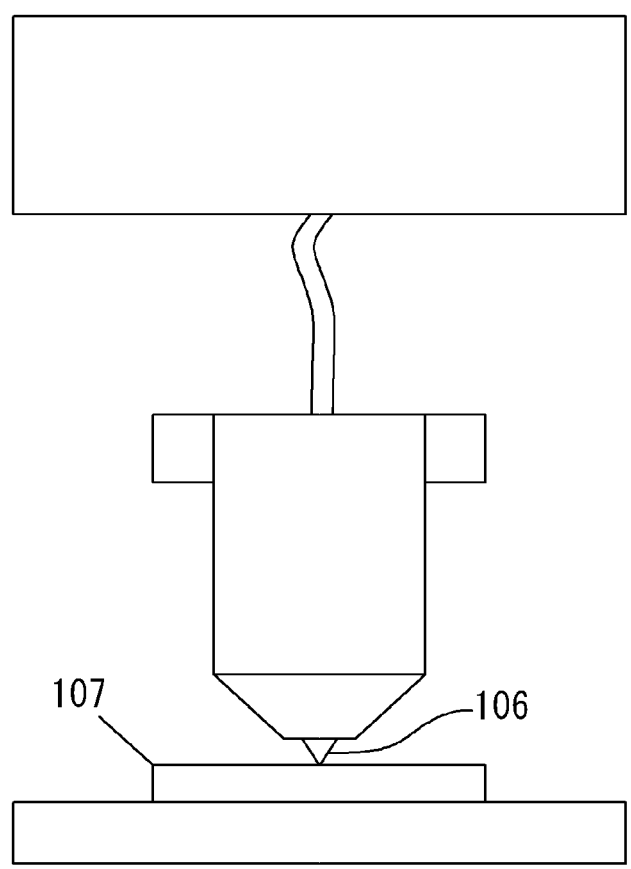
FIG. 10 is an illustrative diagram for describing another example of conventional cutting work using laser light.
Figure 11:
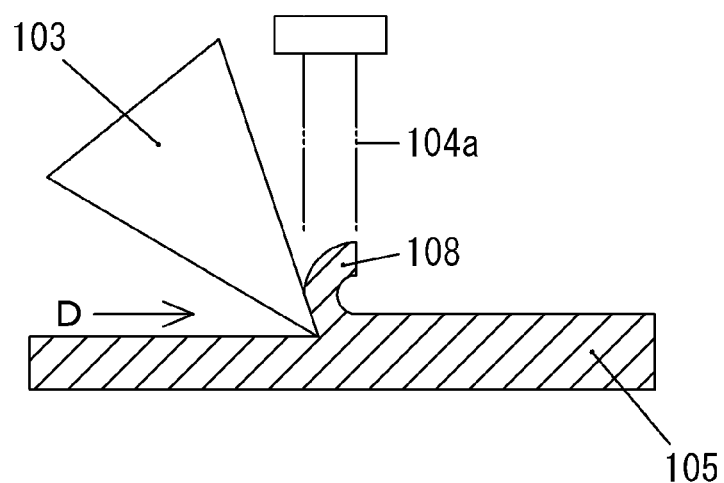
FIG. 11 is an illustrative diagram for describing a problem with the example of the cutting work illustrated in FIGS. 8 and 9.

With regard to the cross-sectional shape of the end surface of the cutting tool 4 as seen along the cutting direction (the direction of arrow D in FIG. 1 or 4) of the hard brittle material, the shape of the blade edge of the cutting tool 4 depends on the material to be cut 6 and the purpose of the cutting work. For example, the cross-sectional shape of the end surface of the cutting tool 4 may be a V shape as seen along the cutting direction (the direction of arrow D in FIG. 1 or 4) of the hard brittle material as illustrated in FIG. 6. Incidentally, the cross-sectional shape of the end surface of the cutting tool 4 refers to the shape of the cross-section perpendicular to the direction of arrow D.

Referring to FIG. 6, the smallest opening angle ϕmin of a V-shaped opening angle ϕ in the V-shaped end surface is determined by the critical angle θmax as a condition for total reflection at the time of emission from n1 to n2 expressed in Equation 9. At that time, the refractive index of the cutting tool 4 corresponding to the wavelength of the laser light is designated as n1, and the refractive index of the atmosphere outside the cutting tool 4 is designated as n2. Therefore, the smallest opening angle ϕmin is expressed as follows:

$$\phi\mathrm{min}=2\times(90°-\theta\mathrm{max}) \quad \text{[Equation 18]}$$

That is, when the end surface of the cutting tool 4 is V-shaped, the V-shaped opening angle ϕ delivers the highest cutting efficiency in ductile mode cutting of the hard brittle material within the range set by Equation 19 as follows:

$$\phi>2\times(90°-\theta\mathrm{max}) \quad \text{[Equation 19]}$$

By forming the end surface of the cutting tool 4 in such a shape as illustrated in FIG. 6, it is possible to process a V groove on the surface of the material to be cut 6 and speed up the V-groove processing.

In particular, when the cutting tool 4 is formed from diamond, the shape of the end surface of the cutting tool 4 illustrated in FIG. 5 or 6 is optimum.

As described above, according to the present invention, it is possible to cut the hard brittle material without generation of cracks, avoid total reflection of the laser light, and improve the efficiency of emitting the laser light.

Further, since the laser light is propagated through the cutting tool 4 and incident to at least a part of the hard brittle material that is in contact with the cutting tool 4 and the rake angle θs part, even cutting dust is produced from the material to be cut 6 during the cutting work, the irradiation of the laser light is not blocked by the cutting dust. Thus, the inhibition of the cutting work can be prevented, which allows the material to be cut 6 to be heated directly by irradiation of the laser light and eliminate the need for excessive laser light heating. Therefore, it is possible to cut the hard brittle material with high dimensional accuracy.

Furthermore, according to the present invention, by propagating the laser light through the cutting tool 4, it is possible to uniform the direction of irradiation of the laser light and the direction of approach of the cutting tool toward the material to be cut 6. Therefore, it is also possible to cut the material to be cut 6 even if it is a non-light-transmittable material. This allows fabrication of a three-dimensional structure having an internal shape such as a cylinder.

LIST OF REFERENCE NUMERALS

1 Cutting apparatus
2 Optical fiber
3 Convergence lens
4 Cutting tool
5 Casing
6 Material to be cut
7 Rake surface of cutting tool
8 Clearance surface of cutting tool
9a, 9b End surface of cutting tool
10 Range where material to be cut can be heated and increased in temperature by laser light
10a Rake angle θs part
10b Part of hard brittle material with metal phase transition

The invention claimed is:
1. A cutting method comprising:
providing a cutting tool for cutting a hard brittle material, the cutting tool being made of a commercially-available square diamond prism, and providing the square diamond prism of the cutting tool with a rake angle;
propagating laser light from a laser light source through an optical fiber to a convergence lens and then into and through the cutting tool, and bringing the cutting tool and the hard brittle material into contact with each other to irradiate, with the laser light, at least a contact part of the cutting tool where the cutting tool and the hard brittle material are in contact with each other and a rake angle part of the cutting tool where the rake angle is provided;

irradiating the hard brittle material through the contact part and the rake angle part with the laser light propagated through the cutting tool except for Fresnel reflection light reflected on an end surface of the cutting tool to soften the hard brittle material; and cutting the softened hard brittle material, wherein the laser light, which is propagated through the cutting tool except for the Fresnel reflection light reflected on the end surface of the cutting tool, is incident, through the contact part and the rake angle part, to the hard brittle material perpendicularly to a planar direction of a surface of the hard brittle material that is in contact with the cutting tool.

2. The cutting method according to claim 1, wherein
the hard brittle material is formed from a material causing metal phase transition by coming into contact with the cutting tool, and
a contact load between the cutting tool and the hard brittle material is set to a load causing the metal phase transition in the hard brittle material.

3. The cutting method according to claim 1, wherein the laser light propagating through the cutting tool is parallel light.

4. The cutting method according to claim 1, wherein
the end surface is formed in an arc shape as the cutting tool is seen along a cutting direction of the hard brittle material, and
the end surface has a radius R as expressed by Equation 4:

$$R > [r/\sin(\theta crt)] \quad \text{[Equation 4]}$$

wherein
a diameter of light flux of the laser light emitted from the end surface of the cutting tool as seen along the cutting direction is 2r, and a critical angle at which the laser light is totally reflected at an angle normal to the end surface of the cutting tool at the time of emission of the laser light from the inside to the outside of the cutting tool is $\theta crt°$.

5. The cutting method according to claim 1, wherein
the end surface is formed in a V shape as the cutting tool is seen along a cutting direction of the hard brittle material, and
the end surface has a V-shaped opening angle $\phi$ under a total-reflection condition, as expressed by Equation 6:

$$\phi > 2 \times (90° - \theta max) \quad \text{[Equation 6]}$$

wherein
the total-reflection condition is expressed by Equation 5:

$$\theta max = \sin^{-1}(n2/n1) \quad \text{[Equation 5]}$$

a refractive index of the cutting tool corresponding to a wavelength of the laser light is n1 and a refractive index of atmosphere outside the cutting tool is n2.

* * * * *